United States Patent
Farooq et al.

(10) Patent No.: US 9,902,362 B2
(45) Date of Patent: Feb. 27, 2018

(54) AIRBAG ASSEMBLY INCLUDING AIRBAG AND PANEL HAVING DEPRESSED REGION

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/186,949

(22) Filed: Jun. 20, 2016

(65) Prior Publication Data

US 2017/0361802 A1   Dec. 21, 2017

(51) Int. Cl.
| | |
|---|---|
| *B60R 21/214* | (2011.01) |
| *B60R 21/232* | (2011.01) |
| *B60N 2/14* | (2006.01) |
| *B60N 2/02* | (2006.01) |
| B60R 21/235 | (2006.01) |
| B60R 21/231 | (2011.01) |
| B60R 21/00 | (2006.01) |

(52) U.S. Cl.
CPC .......... *B60R 21/214* (2013.01); *B60N 2/0292* (2013.01); *B60N 2/14* (2013.01); *B60R 21/232* (2013.01); *B60N 2002/022* (2013.01); *B60R 2021/0032* (2013.01); *B60R 2021/23153* (2013.01); *B60R 2021/23509* (2013.01)

(58) Field of Classification Search
CPC ..... B60R 21/08; B60R 21/214; B60R 21/213; B60R 21/232; B60R 2021/0032; B60R 2021/0253; B60R 2021/23153; B60R 2021/23161; B60R 2021/23192; B60R 2021/23386; B60R 2021/23509; B60N 2/0292; B60N 2/14; B60N 2002/022

See application file for complete search history.

(56) References Cited

U.S. PATENT DOCUMENTS 3,774,936 A * 11/1973 Barnett ................. B60R 21/214
                                                                280/730.1
6,086,092 A     7/2000 Hill
(Continued)

FOREIGN PATENT DOCUMENTS

| DE | 10038720 A1 | 2/2002 |
|---|---|---|
| DE | 102007051282 A1 | 4/2009 |

(Continued)

OTHER PUBLICATIONS

UKIPO Search Report for GB1709581.1 dated Nov. 6, 2017 (4 pages).

*Primary Examiner* — Laura Freedman
(74) *Attorney, Agent, or Firm* — Frank A. MacKenzie; Bejin Bieneman PLC (57) ABSTRACT

An airbag assembly includes an airbag and a panel. The panel extends from a first apex to a second apex each spaced from the airbag. The panel includes a depressed region between the first apex and the second apex. The depressed region is attached to the airbag. During a vehicle impact, the momentum of the occupant may move the occupant toward the depressed region of the panel. The airbag may absorb energy from the occupant, and the apexes encourage the occupant to be retained in the depressed region.

20 Claims, 6 Drawing Sheets

(56) References Cited

U.S. PATENT DOCUMENTS

| | | | | |
|---|---|---|---|---|
| 6,464,250 | B1* | 10/2002 | Faigle | B60R 21/232 280/730.2 |
| 6,722,691 | B1* | 4/2004 | Håland | B60R 21/16 280/730.1 |
| 7,222,877 | B2* | 5/2007 | Wipasuramonton | B60R 21/214 280/729 |
| 7,380,859 | B2* | 6/2008 | Gardiner | B60N 2/01 296/64 |
| 7,559,572 | B2* | 7/2009 | Roberts | B60R 21/232 280/730.2 |
| 7,926,840 | B1 | 4/2011 | Choi | |
| 8,182,014 | B2* | 5/2012 | Mabuchi | B60N 2/01 296/64 |
| 9,452,692 | B1* | 9/2016 | Rawlinson | B60N 2/062 |
| 9,725,064 | B1* | 8/2017 | Faruque | B60N 2/143 |
| 9,744,932 | B1* | 8/2017 | Faruque | B60R 21/16 |
| 9,789,840 | B2* | 10/2017 | Farooq | B60N 2/14 |
| 2005/0275198 | A1 | 12/2005 | Peng et al. | |
| 2010/0133797 | A1 | 6/2010 | Kim et al. | |
| 2012/0049491 | A1 | 3/2012 | Yoo | |
| 2012/0133114 | A1 | 5/2012 | Choi et al. | |
| 2013/0069348 | A1 | 3/2013 | Choi et al. | |
| 2014/0097601 | A1 | 4/2014 | Fukawatase et al. | |
| 2015/0142245 | A1* | 5/2015 | Cuddihy | B60N 2/143 701/23 |
| 2016/0152163 | A1* | 6/2016 | Strasdat | B60R 7/04 296/64 |
| 2017/0028987 | A1* | 2/2017 | Yamada | B60W 50/08 |
| 2017/0144620 | A1* | 5/2017 | Rao | B60R 21/01534 |
| 2017/0144621 | A1* | 5/2017 | Rao | B60R 21/01552 |

FOREIGN PATENT DOCUMENTS

| | | |
|---|---|---|
| EP | 1674351 A1 | 6/2006 |
| FR | 2931421 A1 | 11/2009 |
| GB | 2385303 A | 8/2003 |
| GB | 2548692 A | 9/2017 |
| JP | H11321506 A | 11/1999 |
| WO | 2013058328 A1 | 4/2013 |

\* cited by examiner

AIRBAG ASSEMBLY INCLUDING AIRBAG AND PANEL HAVING DEPRESSED REGION

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities.

DETAILED DESCRIPTION

With reference to the Figures, wherein like numerals indicate like parts throughout the several views, an airbag assembly 10 for a vehicle 12 includes an airbag 14 and a panel 16. The panel 16 extends from a first apex 18 to a second apex 20 each spaced from the airbag 14. The panel 16 includes a depressed region 22 between the first apex 18 and the second apex 20. The depressed region 22 is attached to the airbag 14.

Figure 1:
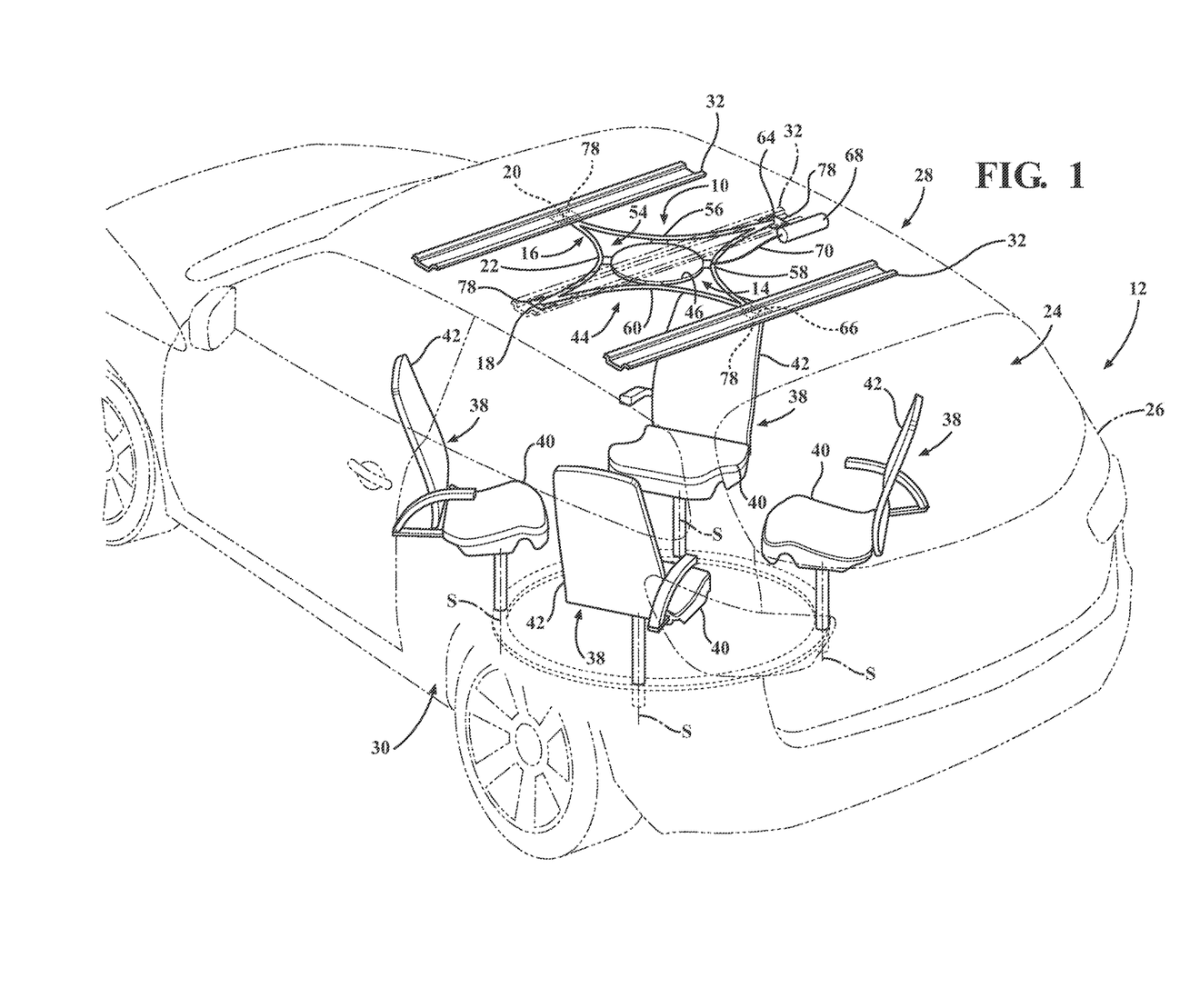
FIG. 1 is a perspective view of a vehicle including an airbag assembly supported by a roof of the vehicle with the airbag assembly in an undeployed position.
Figure 4:
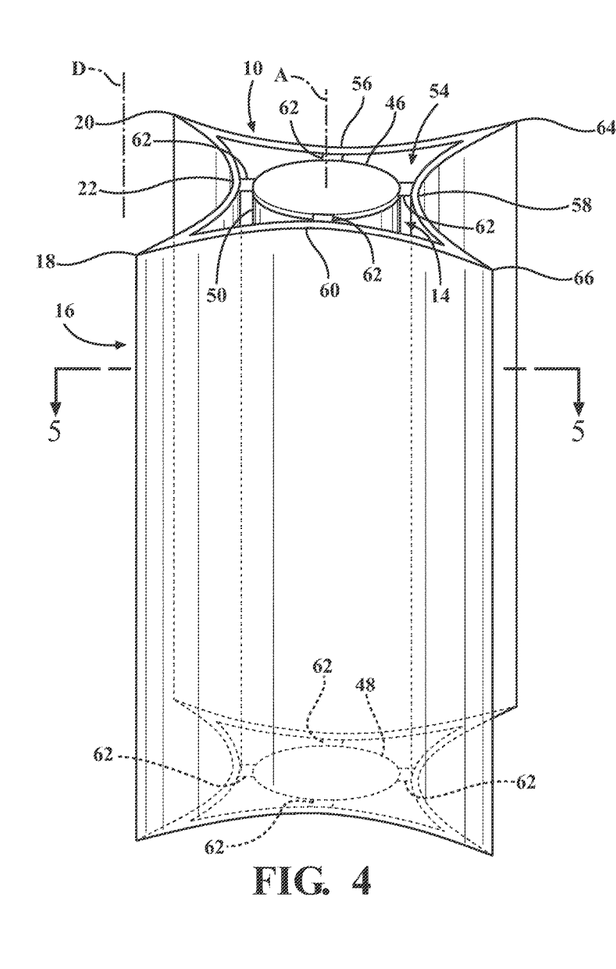
FIG. 4 is a perspective view of the airbag assembly.
Figure 5:
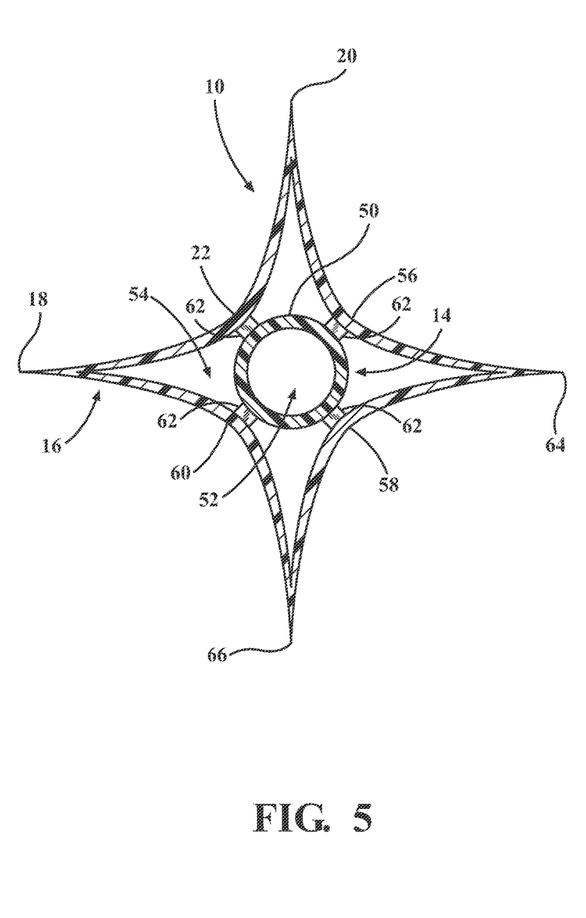
FIG. 5 is a cross-sectional view of the airbag assembly in the deployed position.
Figure 6:
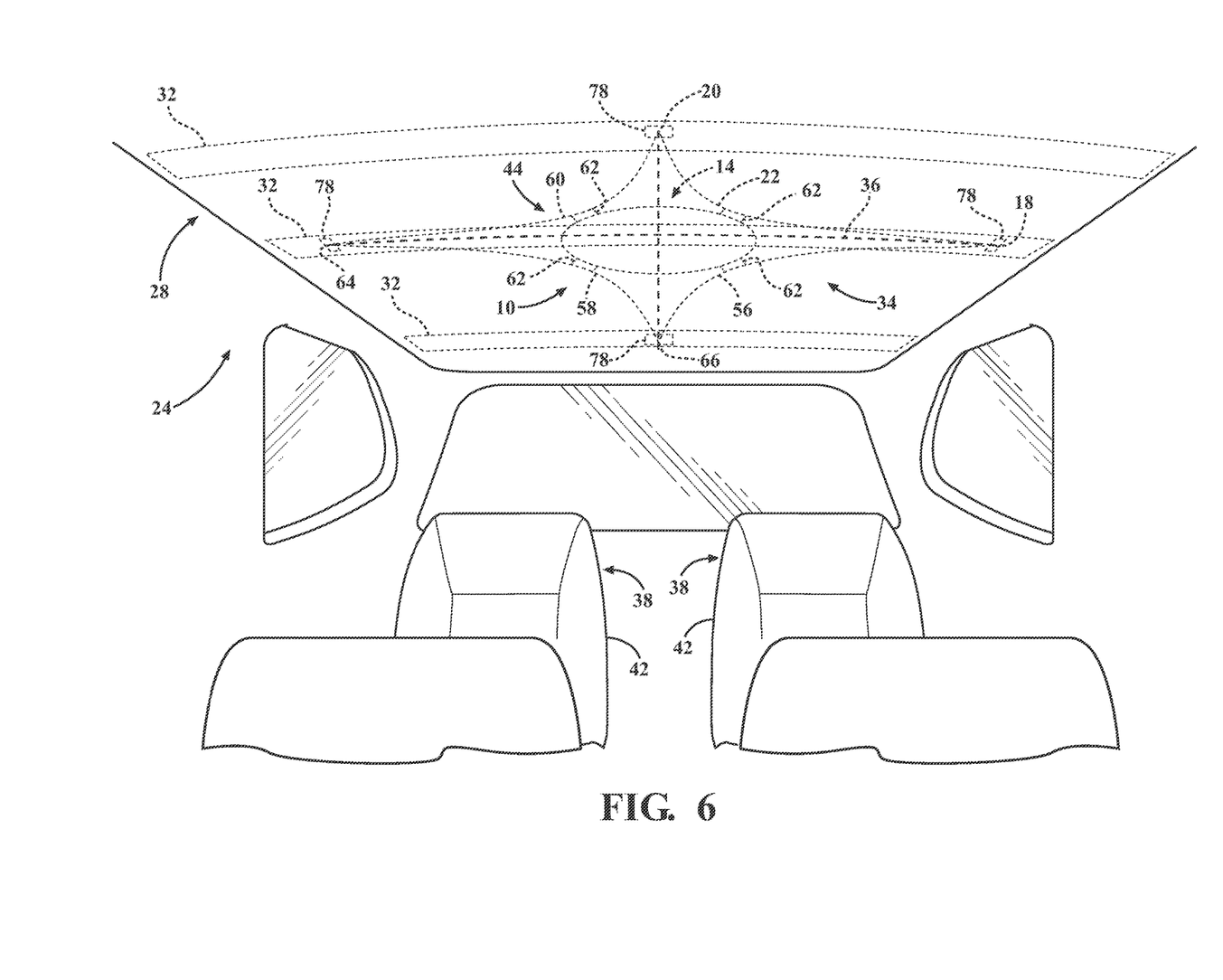
FIG. 6 is a perspective view of an interior of the vehicle including a headliner with tear seams.

As set forth further below, the airbag assembly 10 may be deployed from an undeployed position, as shown in FIGS. 1 and 6, to a deployed position, as shown in FIGS. 2-5. The airbag assembly 10 in the deployed position may absorb energy from an occupant (not shown) during a vehicle impact to reduce the likelihood of the occupant impacting other occupants and/or components of an interior 24 of the vehicle 12. The airbag assembly 10 may be deployed in response to the vehicle impact, as set forth further below. Specifically, the airbag 14 may be inflated from an uninflated position to an inflated position to move the airbag assembly 10 from the undeployed position to the deployed position. As the airbag 14 is inflated, the airbag 14 may elongate to pull the panel 16 to the deployed position.

During the vehicle impact, the occupant may be forced into the depressed region 22 of the panel 16, and the apexes 18, 20, 64, 66 may retain the head of the occupant in the depressed region 22 to reduce the likelihood of the occupant impacting other occupants and/or other components of the interior 24 of the vehicle 12. In this situation, as the head of the occupant impacts the panel 16, the airbag 14 reinforces the panel 16, i.e., backs the panel 16, to absorb energy from the occupant. Also, during the vehicle impact, the legs and knees of the occupant may be forced into the depressed region 22 of the panel 16, and the apexes 18, 20, 64, 66 may retain the legs and knees of the occupant in the depressed region 22. The airbag 14 reinforces the panel 16 to assist in maintaining the occupant in an upright position and in reducing forward movement of the occupant, which may reduce head injury criteria (HIC).

The vehicle 12, for example, may be an autonomous vehicle. In other words, the vehicle 12 may be autonomously operated such that the vehicle 12 may be driven without constant attention from a driver, i.e., the vehicle 12 may be self-driving without human input. During the operation of the autonomous vehicle the occupants may face one another.

As shown in FIG. 1, the vehicle 12 includes a vehicle body 26 defining the interior 24 of the vehicle 12. The vehicle body 26 may include a roof 28, a floor 30, and a plurality of pillars (not numbered). The vehicle body 26 may have a uni-body construction, a body-on-frame construction, or any other suitable construction.

With continued reference to FIG. 1, the roof 28 may include a plurality of roof cross-beams 32 and a headliner 34 supported on the roof cross-beams 32, as shown in FIG. 6. The roof cross-beams 32 may be supported by the pillars and/or any other component of the vehicle body 26.

As shown in FIG. 6, the headliner 34 may have a tear seam 36 for allowing the airbag assembly 10 to break through the headliner 34 toward the floor 30 when the airbag assembly 10 moves to the deployed position. The tear seam 36 may be adjacent to the airbag assembly 10 in the undeployed position. The tear seams 36 may form a cross shape. Alternatively, the tear seams 36 may match the shape of the panel 16, e.g., an isotoxal star.

Figure 2:
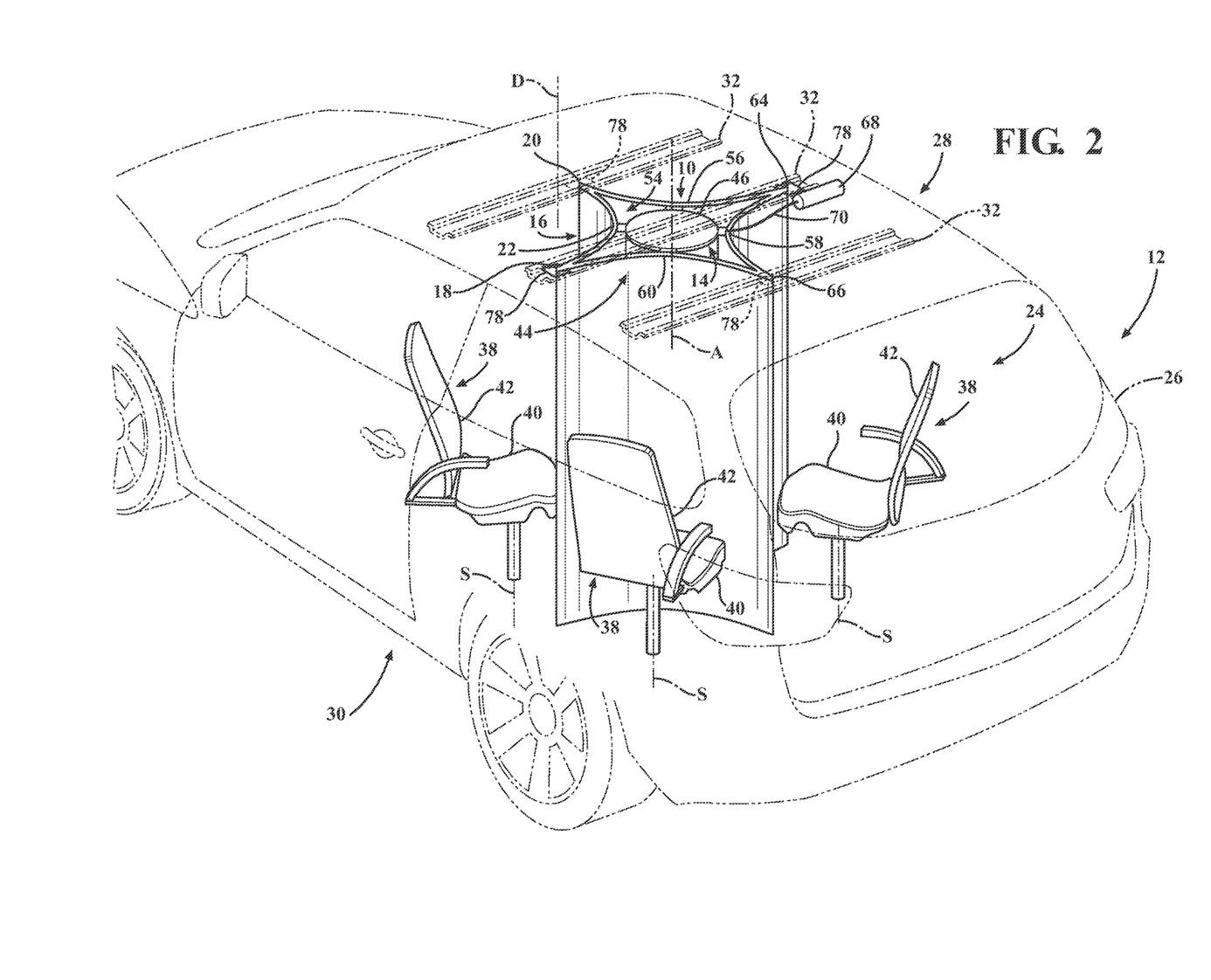
FIG. 2 is a perspective view of FIG. 1 including the airbag assembly in a deployed position defining a plurality of depressed regions aligned with seats of the vehicle.
Figure 3:
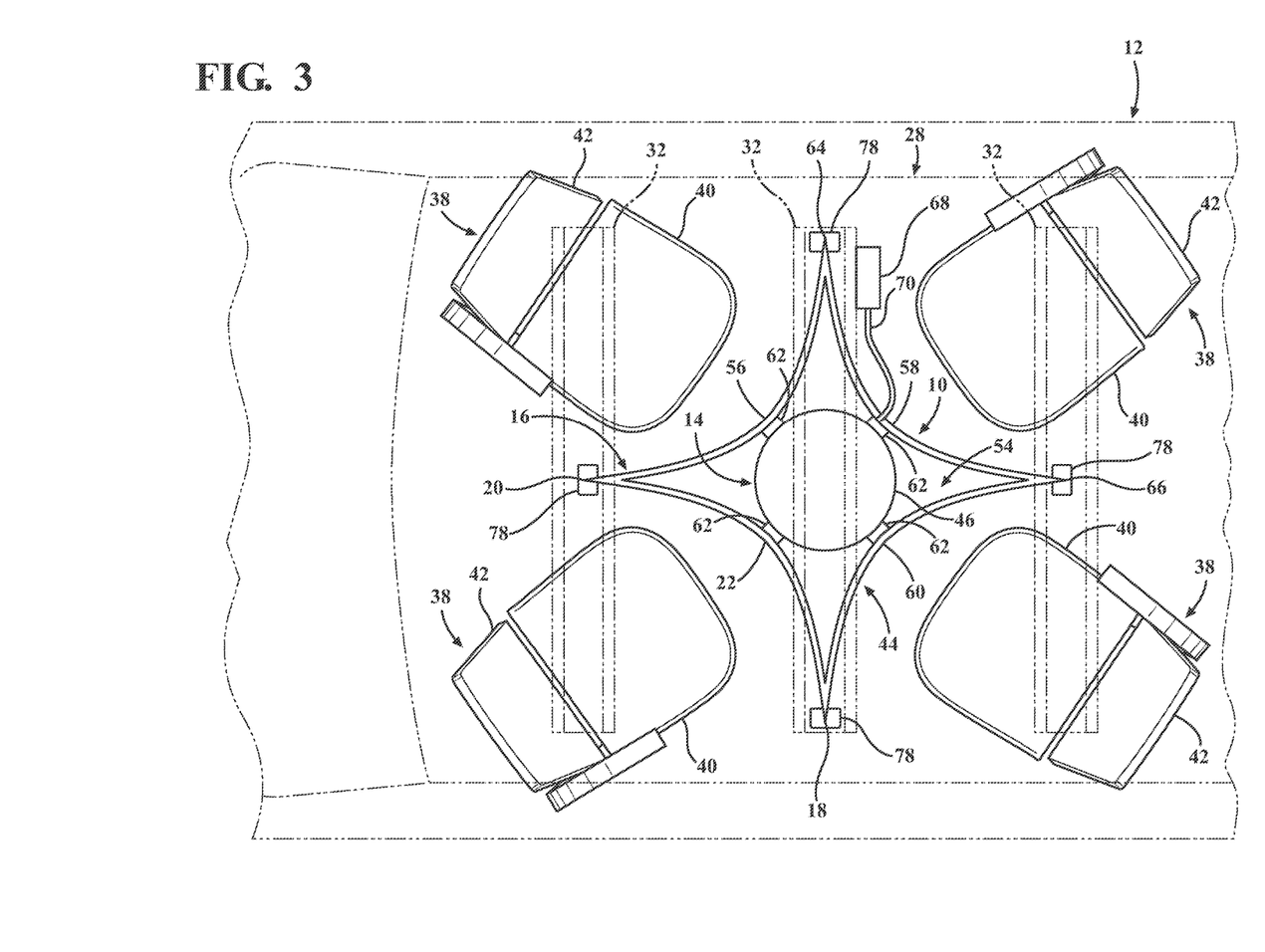
FIG. 3 is a top view of the vehicle including the airbag assembly and the seats.

As shown in FIG. 1, the interior 24 of the vehicle 12 may include one or more seats 38. For example, as shown in the Figures, the interior 24 of the vehicle 12 may include a plurality of seats 38 supported by the floor 30. The vehicle 12 may include any suitable number of seats 38, and the seats 38 may be arranged in any suitable arrangement. The seats 38 and the airbag assembly 10 may be arranged such that the airbag assembly 10 is between the seats 38 in the deployed position, as shown in FIGS. 2-3. For example, as shown in the Figures, the seats 38 may be arranged in a ring pattern. As another example, the seats 38 may be arranged in a front row (not shown) and a rear row (not shown). The seat 38 may be, for example, a bucket seat, a bench seat, a child seat, a booster seat, or any other suitable type of seat.

With continued reference to FIG. 1, the seats 38 may each include a seat bottom 40. A seatback 42 may extend upwardly from the seats bottom 40 and may recline relative to the seat bottom 40. A base (not numbered) may support the seat bottom 40 on the floor 30.

The seats 38 may be mounted in a fixed position on the floor 30 as shown in FIG. 1. Alternatively, the seats 38 may be moveable, independently or together as a unit, relative to the floor 30 of the vehicle 12, e.g., in a circular path around the ring, in a vehicle fore-and-aft direction, and/or a cross-vehicle direction. In other words, the base of the seats 38 may be moveable relative to the floor 30 in the vehicle fore-and-aft direction and/or the cross-vehicle direction.

The seats 38 may be rotatable about a seat axis S. Specifically, the seats 38 may be rotatable to any selected position about the seat axis S, e.g., 180-360 degrees. As shown in FIG. 2, the seat axis S may be generally parallel to an airbag axis A in the deployed position. The seats 38 may be independently rotatable to a position facing each other, as shown in FIGS. 1-3. In this position, for example, the airbag assembly 10 in the deployed position may reduce the likelihood of the occupants impacting one another.

The airbag assembly 10 may be supported by the roof 28. For example, the airbag assembly 10 may be mounted to the roof cross-beams 32 and may be disposed between the roof cross-beams 32 and the headliner 34 in the undeployed position, as shown in FIGS. 1 and 6.

The airbag assembly 10 may include an airbag base 44 coupled to the roof 28 and supporting the airbag 14. The airbag base 44 may house the airbag 14 in the uninflated position, and may provide a reaction surface as the airbag 14 inflates from the uninflated position to the inflated position. The airbag base 44 may, for example, include clips, panels, etc., for attaching to the airbag 14 and for attaching the airbag assembly 10 to the roof cross-beams 32 or other suitable parts of the roof 28.

The airbag 14 may be formed of any suitable type of material, e.g., from a woven polymer. For example, the airbag 14 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

As set forth above, the airbag 14 may be inflatable from the uninflated position to the inflated position. As shown in FIG. 4, the airbag 14 in the inflated position may have a top 46 adjacent the roof 28, a bottom 48 adjacent the floor 30, and a side panel 50 extending from the bottom 48 to the top 46. The airbag 14 may include an inflation chamber 52 defined by the top 46, the bottom 48 and the side panel 50. The airbag 14, i.e., the side panel 50, in the inflated position may be elongated along the airbag axis A. The airbag 14 may have any suitable shape, e.g., a cylindrical shape, in the inflated position.

As shown in FIG. 4, the panel 16 may extend circumferentially around the airbag 14. In other words, the panel 16 may extend completely around the airbag 14. The panel 16 may be concentric with the airbag 14 around the airbag axis A, i.e., the airbag axis A may be central to both the airbag 14 and the panel 16 such that the panel 16 and the airbag 14 share the airbag axis A.

As shown in FIG. 5, the panel 16 is external to the inflation chamber 52 of the airbag 14. In other words, the panel 16 is external to the side panel 50 of the airbag 14, with the side panel 50 disposed between the inflation chamber 52 and the panel 16. The panel 16 and the side panel 50 may define a void 54 between the panel 16 and side panel 50. The void 54 may be external to the inflation chamber 52 and open to the atmosphere when the panel 16 is deployed from the undeployed position to the deployed position. The void 54 may be completely separated from the inflation chamber 52 by the side panel 50, or alternatively, may be in communication with the inflation chamber 52 through vents (not shown) in the side panel 50, but in any event, the void 54 is open to atmosphere.

The panel 16 may be a single continuous unit that extends circumferentially around the airbag 14, e.g., a single piece of fabric. Alternatively, the panel 16 may include a plurality of segments, i.e., two or more. For example, the segments may be attached to each other in any suitable fashion, e.g., a plurality of fabric panels attached by stitching.

The panel 16 may be formed of any suitable type of fabric, e.g., from a woven polymer. For example, the panel 16 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The panel 16 and the airbag 14 may be formed of the same type of material, or of a different type of material.

With reference to FIGS. 2-5, the panel 16 may include a plurality of depressed regions 22, 56, 58, 60 spaced from each other circumferentially around the airbag 14. Specifically, the panel 16 may include the depressed region 22, a second depressed region 56, a third depressed region 58, and a fourth depressed region 60 (as shown in FIGS. 4 and 5). The panel 16 may include any suitable number of depressed regions 22, 56, 58, 60, i.e., one or more. As shown in FIG. 4, the depressed region 22 is between two apexes 18, 20.

The panel 16 may be attached to the airbag 14 at the depressed region 22. For example, the depressed region 22 may be attached to the side panel 50, the bottom 48, and/or the top 46 of the airbag 14. The depressed region 22, for example, may be attached to the airbag 14 with tethers 62. Alternatively, the depressed region 22 may be attached to the airbag 14 by stitching or any other suitable attachment. Since the panel 16 is attached to the airbag 14, the airbag 14 pulls the panel 16 toward the deployed position as the airbag 14 is inflated from the uninflated position to the inflated position.

With continued reference to FIGS. 2-5, each depressed region 22, 56, 58, 60 may be curved about a depressed region axis D. The depressed region 22 may have a concave shape with respect to the occupant. The concave shape may receive one of the seats 38. Alternatively, each of the depressed regions 22, 56, 58, 60 may have any suitable shape that receives the occupant of the seat 38 between two apexes 18, 20, 64, 66 during the vehicle impact. With reference to FIGS. 2 and 4, each depressed region 22, 56, 58, 60 may be elongated along the depressed region axis D.

With continued reference to FIG. 2, in the deployed position, each seat 38 may be disposed in one of the depressed regions 22, 56, 58, 60. In other words, each seat 38 may be positioned adjacent to one of the depressed regions 22, 56, 58, 60 with two of the apexes 18, 20, 64, 66 wrapping partially around the seat 38. The depressed region 22 may accommodate the rotation of the seat 38. In other words, the seat 38 may be able to rotate within the depressed region 22.

The panel 16 may include a plurality of apexes 18, 20, 64, 66 spaced from each other circumferentially around the airbag 14. Specifically, the panel 16 may include the first apex 18, the second apex 20, a third apex 64, and a fourth apex 66 (as shown in FIGS. 4 and 5). The panel 16 may include any suitable number of apexes 18, 20, 64, 66, i.e., two or more.

As shown in FIG. 3, each of the apexes 18, 20, 64, 66 are spaced from the airbag 14. Each of the apexes 18, 20, 64, 66 may include an angled point, as shown in the figures. Alternatively, each of the apexes 18, 20, 64, 66 may be rounded.

The apexes 18, 20, 64, 66 may be attached to the roof 28. As one example, as shown in FIG. 2, each of the apexes 18, 20, 64, 66 may be attached to the roof 28 with tethers 78. Specifically, the tethers 78 extend from each apex 18, 20, 64, 66 to one of the roof cross-beams 32. The tethers 78 may be attached to any suitable portion of the apexes 18, 20, 64, 66, e.g., a top of the apex adjacent the top 46 of the airbag 14, and/or may be attached to each apex 18, 20, 64, 66 at multiple locations along the depressed region axis D. In the alternative to the roof cross-beams 32, the tethers 78 may extend to any other component of the roof 28, airbag base 44, or vehicle body 26. In the alternative to the tethers 78, other suitable examples include clips, screws, or any other suitable fasteners. Alternatively, each of the apexes 18, 20, 64, 66 may be attached to an intermediate component, e.g., a plate, attached to the roof 28.

The airbag assembly 10 may include an inflator 68 in fluid communication with the airbag 14 that inflates the airbag 14 from the uninflated position to the inflated position. The inflator 68 expands the airbag 14 with an inflation medium, such as a gas, to move the airbag 14 from the uninflated position to the inflated position. Specifically, the inflator 68 may be in communication with the inflation chamber 52 to supply the inflation medium to the inflation chamber 52.

The inflator 68 may be supported by the roof 28, e.g., disposed in the airbag base 44, or mounted directly to the roof cross-beam 32. Alternatively, the inflator 68 may be disposed at any other suitable part of the vehicle body 26, e.g., at the pillars.

The inflator 68 may be, for example, a pyrotechnic inflator that uses a chemical reaction to drive the inflation medium into the airbag 14. Alternatively, the inflator 68 may be, for example, a cold-gas inflator that, when activated, ignites a pyrotechnic charge that creates an opening for releasing the pressurized inflation medium to the airbag 14 via a fill tube 70. Alternatively, the inflator 68 may be of any suitable type, for example, a hybrid inflator.

Figure 7:
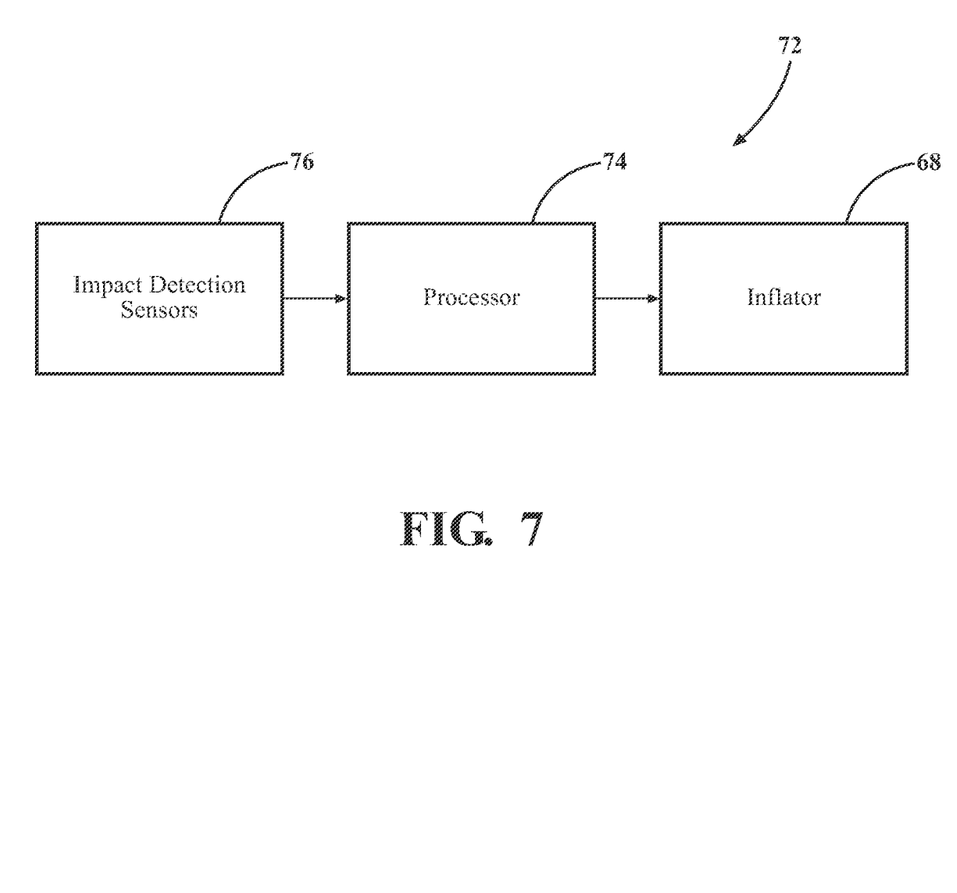
FIG. 7 is a flowchart of an inflation system of the vehicle.

With reference to FIG. 7, the vehicle 12 may include an inflation system 72. The inflation system 72 includes a processor 74 programmed to initiate an inflation of the airbag 14 in response to the vehicle impact. The processor 74 may be embedded in a microcontroller. The microcontroller may include memory, etc. The memory of the microcontroller may store instructions executable by the processor 74 and the processor 72 may read the instructions from the memory and execute the instructions.

The vehicle 12 may include impact detection sensors 76 programmed to detect the vehicle impact to the vehicle body 26. The impact detection sensors 76 may be disposed in the vehicle body 26 or elsewhere in the vehicle 12. The impact detection sensors 76 may be of various types, e.g., pressure sensor, acceleration sensor, vision sensor, etc. When the vehicle impact occurs, the processor 74 may receive one or more signals from the impact detection sensors 76 indicating the vehicle impact. In response to receiving the signals from the impact detection sensors 76, the processor 74 may initiate the inflation of the airbag 14. Alternatively, the processor 74 may initiate the inflation of the airbag 14 selectively based on information from the impact detection sensors 76 identifying the physical characteristics of the vehicle impact, e.g., which side of the vehicle 12 impacted, amount of pressure applied to the vehicle body 26, etc. and also seat occupancy information, e.g., by using the occupancy sensors disposed inside the seats 38 sensing the occupancy status of the seats 38.

In order to receive the signals from the impact detection sensors 76 and to initiate the inflation of the airbag 14, the processor 74 communicates with the impact detection sensors 76 and the inflator 68, e.g., through a direct electrical wiring, through which an analog or a digital signal is transmitted, or through a communication network like CAN (Control Area Network), Ethernet, LIN (Local Interconnect Network) or any other way.

In operation, the airbag assembly 10 is in the undeployed position, as shown in FIGS. 1 and 3, under normal operating conditions of the vehicle 12. When the impact detention sensor senses an impact of the vehicle 12, the processor 74 triggers the inflator 68 to inflate the airbag 14 with the inflation medium from the uninflated position to the inflated position. When the airbag 14 is inflated to the inflated position, the airbag 14 elongates, i.e., pulls the panel 16 from the undeployed position to the deployed position, as shown in FIG. 2. In other words, as the airbag 14 is inflated, the airbag 14 may pull the depressed regions 22, 56, 58, 60 along the depressed region axis D. As the occupants move within the vehicle 12 due to the momentum of the vehicle impact, the occupants may move toward respective depressed regions 22, 56, 58, 60. When the occupant impacts the depressed region 22, the airbag 14 backs the panel 16 to absorb energy from the occupant. Specifically, the airbag 14 may absorb energy from the head and upper torso of the occupant, and may receive the legs and knees of the occupant to encourage the occupant to remain upright. The apexes 18, 20, 64, 66 may retain the occupant within the depressed region 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle interior comprising:
   a roof;
   an airbag supported by the roof;
   a panel extending from a first apex to a second apex, the first apex and the second apex being spaced from the airbag;
   the panel including a depressed region between the first apex and the second apex, the depressed region being attached to the airbag;
   wherein the panel extends from the second apex to a third apex, and wherein the panel includes a second depressed region between the second apex and the third apex, the second depressed region being attached to the airbag.

2. The vehicle interior according to claim 1, wherein the depressed region has a concave shape.

3. The vehicle interior according to claim 1, wherein the first apex and the second apex are attached to the roof.

4. The vehicle interior according to claim 3, wherein the airbag includes a bottom and a top disposed between the bottom and the roof, and wherein the panel is attached to the bottom of the airbag.

5. The vehicle interior according to claim 1, wherein the airbag includes a bottom and a top disposed between the bottom and the roof, and wherein the panel is attached to the bottom of the airbag.

6. The vehicle interior according to claim 5, wherein the panel is attached to the top.

7. The vehicle interior according to claim 1, wherein the airbag is elongated along an airbag axis transverse to the roof, and the depressed region is curved about a depressed region axis generally parallel with the airbag axis.

8. The vehicle interior according to claim 1, wherein the airbag is inflatable to an inflated position, and further comprising a seat disposed in the depressed region when the airbag is in the inflated position.

9. The vehicle interior according to claim 8, wherein the airbag is elongated from the roof along an airbag axis in the inflated position, and wherein the seat is rotatable relative to the airbag about a seat axis generally parallel to the airbag axis.

10. The vehicle interior according to claim 1, wherein the airbag extends from the roof along an airbag axis transverse to the roof, and the panel circumferentially surrounds the airbag entirely around the airbag axis.

11. The vehicle interior according to claim 1, wherein the airbag includes an inflation chamber, and wherein the panel is external to the inflation chamber.

12. The vehicle interior according to claim 1, wherein the panel is made of fabric.

13. An airbag assembly comprising:
an airbag;
a panel extending from a first apex to a second apex, the first apex and the second apex being spaced from the airbag;
the panel including a depressed region between the first apex and the second apex, the depressed region being attached to the airbag;
wherein the panel extends from the second apex to a third apex, and wherein the panel includes a second depressed region between the second apex and the third apex, the second depressed region being attached to the airbag.

14. The airbag assembly according to claim 13, wherein the depressed region has a concave shape.

15. The airbag assembly according to claim 13, wherein the airbag is elongated along an airbag axis, and the depressed region is curved about a depressed region axis generally parallel with the airbag axis.

16. The airbag assembly according to claim 13, wherein the panel extends circumferentially around the airbag around an airbag axis.

17. The airbag assembly according to claim 13, wherein the airbag includes an inflation chamber, and wherein the panel is external to the inflation chamber.

18. The airbag assembly according to claim 13, wherein the panel is made of fabric.

19. A vehicle interior comprising:
a roof;
an airbag supported by the roof;
a panel extending from a first apex to a second apex, the first apex and the second apex being spaced from the airbag;
the panel including a depressed region between the first apex and the second apex, the depressed region being attached to the airbag;
wherein the airbag is inflatable to an inflated position, and further comprising a seat disposed in the depressed region when the airbag is in the inflated position;
wherein the airbag is elongated from the roof along an airbag axis in the inflated position, and wherein the seat is rotatable relative to the airbag about a seat axis generally parallel to the airbag axis.

20. A vehicle interior comprising:
a roof;
an airbag supported by the roof;
a panel extending from a first apex to a second apex, the first apex and the second apex being spaced from the airbag;
the panel including a depressed region between the first apex and the second apex, the depressed region being attached to the airbag;
wherein the airbag extends from the roof along an airbag axis transverse to the roof, and the panel circumferentially surrounds the airbag entirely around the airbag axis.

* * * * *